Feb. 10, 1942.   W. J. HOGG   2,272,200
BORING OR INTERNAL FORMING TOOL
Filed Dec. 3, 1940   2 Sheets-Sheet 2
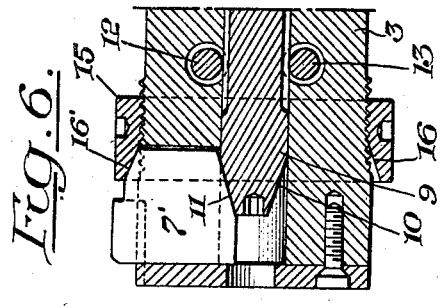
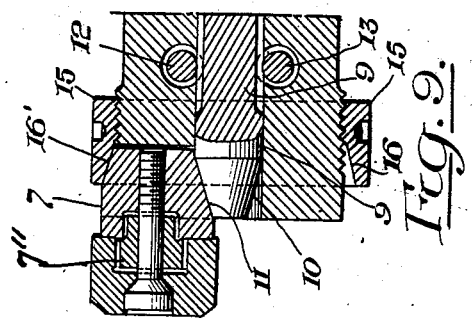
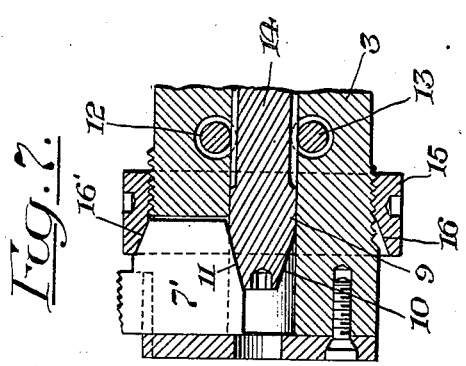
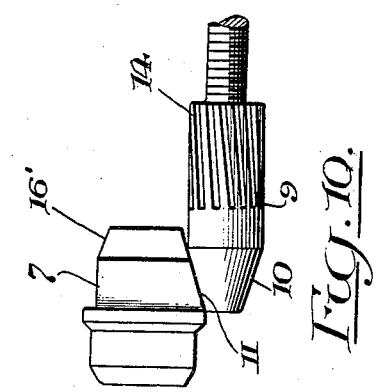
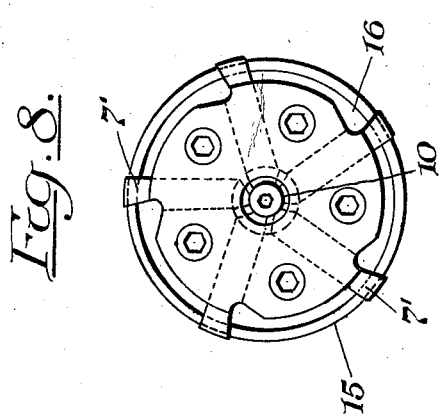
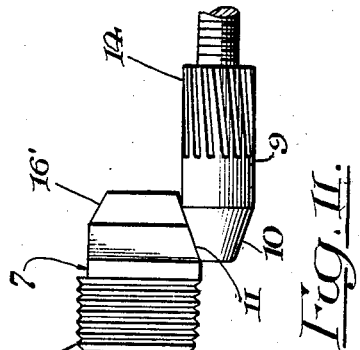
Inventor
William J. Hogg
by his Attorney Patented Feb. 10, 1942

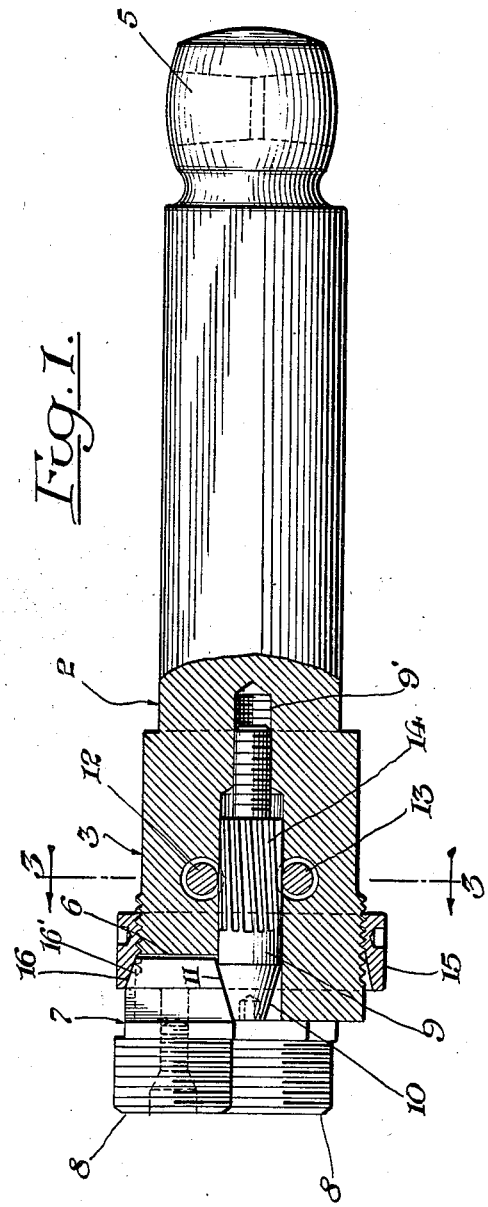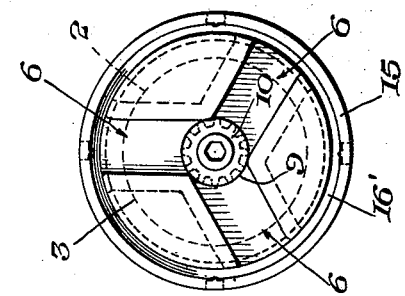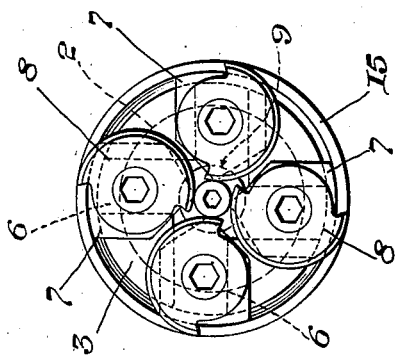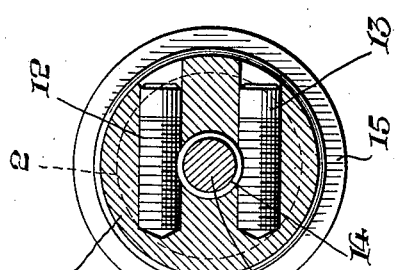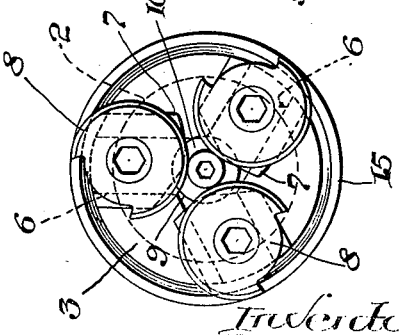

2,272,200

UNITED STATES PATENT OFFICE 2,272,200

BORING OR INTERNAL FORMING TOOL

William J. Hogg, Cleveland, Ohio, assignor to The National Acme Company, Cleveland, Ohio, a corporation of Ohio Application December 3, 1940, Serial No. 368,307

20 Claims. (Cl. 77—76)

This invention relates to boring or internal forming tools, the object of the invention being to provide an improved interchangeable internal boring tool having a series of adjustable cutters which may be radially adjusted by a simple and effective means to cut various sizes of work.

A further object of the present invention is the provision of an improved tool of this class which is inexpensive to manufacture, simple in construction and efficient in use.

In the drawings accompanying and forming a part of this specification,

Fig. 1 is a side view partly in section of this improved tool.

Fig. 2 is a front end view thereof illustrating three radially shiftable circular cutters or chasers.

Fig. 3 is a section taken on line 3—3 of Fig. 1.

Fig. 4 is a front end view of the tool body or shank with the tools removed.

Fig. 5 is a front end view illustrating four radially shiftable circular cutters.

Fig. 6 is a sectional side view of the front portion of the tool illustrating a blade type boring tool carried thereby.

Fig. 7 is a similar view illustrating a blade type threading tool.

Fig. 8 is a front end view of Fig. 6.

Fig. 9 is a view similar to Fig. 6 but illustrating a circular boring tool.

Fig. 10 is a fragmentary view illustrating a stepped circular forming tool for internal milling, and Fig. 11 is a similar view illustrating a circular threading tool.

Similar characters of reference indicate corresponding parts in the several figures.

Before explaining in detail the present improvement and its mode of operation, I desire to have it understood that the invention is not limited to the details of construction and arrangement of parts illustrated in the accompanying drawings since the invention is capable of other embodiments, and that the phraseology employed is for the purpose of description and not of limitation.

This improved tool comprises a body or shank 2 having an enlarged head 3, the rear end of the shank having a ball-formed end 5 adapted to be carried by any suitable machine. The head 3 is provided with radially extending T-slots 6 for the reception of similarly formed radially adjustable cutter or chaser-carrying blocks 7 and chasers or cutters 8. The blocks are thus interlocked with the shank.

Within an axial bore of the body 2, a core piece or shiftable member 9 is mounted with its inner end threaded to engage a threaded opening 9' of the shank and provided at its front end with a tapered nose 10 to engage corresponding tapered portions 11 of the chaser blocks 7.

A pair of transversely extending, parallelly located screws or studs 12 and 13 are provided in the body in position to engage a worm screw portion 14 of the core piece thereby to rotate the latter, the rotation of which axially adjusts the core piece which, in turn radially adjusts the chaser or cutter blocks and their chasers or cutters. These screw-formed-studs 12 and 13 have their outer ends formed and in position to be engaged at the side of the shank by a suitable tool for turning them.

Carried at the front end of the body is an adjustable ring 15 threaded on the end of the shank and provided with a tapered portion 16 to engage a corresponding tapered portion 16' of the block 7, whereby adjustment of the core piece 9 and ring 15 will not only adjust the cutters radially but also securely hold them in place.

A suitable number of radially adjustable cutters or chasers may be carried by the shank and may be in the form of boring tools, as shown in Fig. 9, stepped forming tools as shown in Fig. 10, threading chasers as shown in Fig. 11, or of any other suitable form. Also, tools of a tangential or blade type, as shown in Figs. 6, 7 and 8, may be used by substituting suitable supporting blocks 7' for the blocks 7 shown in the other figures.

In the operation of this improved tool, adjustment for diameter is effected by loosening the ring 15 and then loosening either the screw 12 or 13 and tightening the other. Turning of these screws causes the core piece 9 to rotate and its threaded engagement with the body 2 translates this rotary movement into an axial movement, thereby shifting the chaser blocks and chasers radially to adjust them to cut the desired diameter of work. After the core piece 9 has been shifted to obtain the proper adjustment, the ring 15 is turned on the threaded shank until its tapered bore 16 properly engages the tapered portions of the chaser blocks 7 and locks the chasers in cutting position.

In practice, the chasers may be mounted upon their blocks similar to the manner shown in my Patent 1,952,205 of March 27th, 1934, or my Patent 1,923,265 of August 22nd, 1933, wherein a serrated bushing and pilot are illustrated, a similar bushing being shown at 1'', Fig. 9, and the blocks may be made similar to those shown in my Patent 2,103,462 of December 28th, 1937, and as a result of this mounting, the chasers may be more readily positioned to centralize them so that they will all cut equally and they may be more readily reground in the manner explained in said patents.

In Figs. 6 to 8, tangential or blade type cutters or chasers are shown instead of circular chasers, the blocks 7 being suitably constructed for the reception of such chasers where it is necessary to use a larger number of cutters or for smaller work.

Thus, this same tool can be used for plain boring, stepped boring, or threading with any desired number of chasers or cutters according to the requirements of the work, the cutters being interchangeable and also radially adjustable for varying diameters of internal work.

It is to be understood that by describing herein in detail any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use,

I claim:

1. An interchangeable internal cutting or boring tool comprising a shank, a series of radially adjustable blocks carried at the end of the shank, a cutter carried by each of said blocks, transversely extending and cooperating screw-formed means including an axially shiftable means carried by the shank for simultaneously adjusting the blocks and thereby the cutters, and means for locking the blocks and thereby the cutters in their adjusted positions.

2. An interchangeable internal cutting or boring tool comprising a shank, a series of radially adjustable blocks carried at the end of the shank, a cutter carried by each of said blocks, cooperating screw-formed means comprising a rotatable axially shiftable means carried by the shank for simultaneously adjusting the blocks and thereby the cutters and rotatable means extending transversely of the shank for shifting the axially shiftable means, and an exteriorly located rotatable means also carried by the shank for locking the blocks and thereby the cutters in their adjusted positions.

3. An interchangeable internal cutting or boring tool comprising a shank, a series of radially adjustable blocks carried at the end of the shank, a cutter carried by each of said blocks, rotatable axially shiftable means carried by the shank for adjusting the blocks and thereby the cutters, an exteriorly located rotatable means also carried by the shank for locking the blocks and thereby the cutters in their adjusted positions, and spaced parallelly located rotatable means extending transversely of the shank for engaging at opposite sides thereof and axially shifting the axially shiftable means.

4. An interchangeable internal cutting or boring tool comprising a shank, a series of radially adjustable blocks carried at the end of the shank, a cutter carried by each of said blocks, transversely extending cooperating screw-formed means including a rotatable axially shiftable means carried by the shank for simultaneously adjusting the blocks and thereby the cutters, and an exteriorly located rotatable means also carried by the shank for locking the blocks and thereby the cutters in their adjusted positions, said axially shiftable means and blocks having cooperating tapered faces.

5. An interchangeable internal cutting or boring tool comprising a shank, a series of radially adjustable blocks carried at the end of the shank, a cutter carried by each of said blocks, transversely extending cooperating screw-formed means including a rotatable axially shiftable means carried by the shank for simultaneously adjusting the blocks and thereby the cutters, and an exteriorly located rotatable means also carried by the shank for locking the blocks and thereby the cutters in their adjusted positions, said exteriorly located rotatable means and blocks having cooperating tapered faces.

6. An interchangeable internal cutting or boring tool comprising a shank, a series of radially adjustable blocks carried at the end of the shank, a cutter carried by each of said blocks, transversely extending cooperating screw-formed means including a rotatable axially shiftable means carried by the shank for simultaneously adjusting the blocks and thereby the cutters, and an exteriorly located rotatable means also carried by the shank for locking the blocks and thereby the cutters in their adjusted positions, both said axially shiftable means and said exteriorly located rotatable means and blocks having cooperating tapered faces.

7. An interchangeable internal cutting or boring tool comprising a shank, a rotatable axially shiftable member carried by the shank and having threaded engagement therewith and provided with a longitudinally extending worm and a tapered end, a series of radially shiftable blocks interlocked with the shank and having tapered portions cooperating with the tapered end of the axially shiftable member, an interchangeable cutter carried by each of said blocks, transversely extending threaded rotatable means carried by the shank for engaging the axially shiftable member thereby to adjust the blocks and their cutters, and a threaded ring located exteriorly of the shank and having a tapered portion cooperating with a similar tapered portion of the blocks for locking the block and thereby the cutters in fixed position.

8. An interchangeable internal cutting or boring tool comprising a shank, a rotatable axially shiftable member carried by the shank and having threaded engagement therewith and provided with a longitudinally extending worm and a tapered end, a series of radially shiftable blocks interlocked with the shank and having tapered portions cooperating with the tapered end of the axially shiftable member, an interchangeable circular cutter carried by each of said blocks, transversely extending threaded rotatable means carried by the shank for engaging the axially shiftable member thereby to adjust the blocks and their cutters, and a threaded ring located exteriorly of the shank and having a tapered portion cooperating with a similar tapered portion of the blocks for locking the blocks and thereby the cutters in fixed position.

9. An interchangeable internal cutting or boring tool comprising a shank, a rotatable axially shiftable member carried by the shank and having threaded engagement therewith and provided with a longitudinally extending worm and a tapered end, a series of radially shiftable blocks interlocked with the shank and having tapered portions cooperating with the tapered end of the axially shiftable member, an interchangeable cutter carried by each of said blocks, transversely extending threaded rotatable means carried by the shank for engaging the axially shiftable member thereby to adjust the blocks and their cutters, and a threaded ring located exteriorly of the shank and having a tapered portion cooperating with a similar tapered portion of the blocks for locking the blocks and thereby the cutters in fixed position, said transversely extending rotatable means spaced apart and located at opposite sides of the axially shiftable member.

10. An internal cutting or boring tool comprising a shank, a series of radially adjustable blocks carried at the end thereof, a cutter carried by each block, transversely extending cooperating screw-formed means including an axially shiftable means carried by the shank and having means cooperating with the blocks for simultaneously adjusting said blocks and means carried by the shank for axially shifting said shiftable means, and means carried exteriorly of the shank and having means cooperating with the blocks for locking said blocks in fixed position.

11. An internal cutting or boring tool comprising a shank, a series of radially adjustable blocks carried at the end thereof, a cutter carried by each block, transversely extending cooperating screw-formed means including an axially shiftable means carried by the shank and having means cooperating with the blocks for simultaneously adjusting said blocks and means located transversely of and within the shank for axially shifting said shiftable means, and means carried exteriorly of the shank and having means cooperating with the blocks for locking said blocks in fixed position.

12. An internal cutting or boring tool comprising a shank, a series of radially adjustable blocks carried at the end thereof, a cutter carried by each block, axially shiftable means carried by the shank and having means cooperating with the blocks for adjusting said blocks, means located transversely of the shank and spaced apart and at opposite sides of the axially shiftable means for axially shifting said shiftable means, and means carried exteriorly of the shank and having means cooperating with the blocks for locking said blocks in fixed position.

13. An internal cutting or boring tool comprising a shank, a series of radially adjustable blocks carried at the end thereof, an interchangeable cutter carried by each block, transversely extending cooperating screw-formed means including an axially shiftable means carried by the shank and having means cooperating with the blocks for simultaneously adjusting said blocks and means carried by the shank for axially shifting said shiftable means, and means carried exteriorly of the shank and having means cooperating with the blocks for locking said blocks in fixed position.

14. An internal cutting or boring tool comprising a shank, a series of radially adjustable blocks carried at the end thereof, an interchangeable circular cutter carried by each block, transversely extending cooperating screw-formed means including an axially shiftable means carried by the shank and having means cooperating with the blocks for simultaneously adjusting said blocks and means carried by the shank for axially shifting said shiftable means, and means carried exteriorly of the shank and having means cooperating with the blocks for locking said blocks in fixed position.

15. An interchangeable internal cutting or boring tool comprising a shank, a series of radially adjustable blocks carried at the end of the shank, a circular cutter carried by each of said blocks, transversely extending cooperating screw-formed means including an axially shiftable means carried by the shank for simultaneously adjusting the blocks and thereby the cutters, and an exteriorly located rotatable means also carried by the shank for locking the blocks and thereby the cutters in their adjusted positions.

16. An internal cutting or boring tool comprising a shank, a series of radially adjustable blocks carried at the end thereof, a circular cutter carried by each block, said block and cutter having serrated openings, the serrations of one being different from those of the other, a serrated bushing fitting into said openings, transversely extending cooperating screw-formed means including an axially shiftable means carried by the shank and cooperating with the blocks for simultaneously adjusting said blocks and means carried by the shank for axially shifting said shiftable means, and means carried exteriorly of the shank and cooperating with the blocks for locking said blocks in fixed position.

17. An internal boring tool comprising a shank, a series of radially adjustable blocks carried at the end thereof, a boring cutter carried by each block, a worm screw-formed axially shiftable means carried by the shank and cooperating with the blocks for simultaneously adjusting said blocks, cooperating screw means transversely carried by the shank for axially shifting said shiftable means, and means carried exteriorly of the shank and cooperating with the blocks for locking said blocks in fixed position.

18. An interchangeable internal cutting or boring tool comprising a shank, a series of radially adjustable cutters carried at the end of the shank, transversely extending cooperating means carried by the shank for simultaneously adjusting the cutters comprising a rotatable and axially shiftable worm screw means and transversely extending screw means cooperating with said worm screw means, and means for locking the cutters in their adjusted positions.

19. An interchangeable internal cutting or boring tool comprising a shank, a series of radially adjustable cutters carried at the end of the shank, transversely extending cooperating means carried by the shank for simultaneously adjusting the cutters comprising a rotatable and axially shiftable worm screw means and transversely extending screw means cooperating with said worm screw means at opposite sides thereof, and means for locking the cutters in their adjusted positions.

20. An internal cutting or boring tool comprising a shank, a series of radially adjustable blocks carried at the end thereof, a circular cutter carried by each block, said block and cutter having means for adjusting the cutter relative to its block, transversely extending cooperating screw means including an axially shiftable means carried by the shank and cooperating with the blocks for simultaneously adjusting said blocks and means carried by the shank for axially shifting said shiftable means, and means carried exteriorly of the shank and cooperating with the blocks for locking said blocks in fixed position.

WILLIAM J. HOGG.